(No Model.)  2 Sheets—Sheet 1.
A. H. PERKINS.
FLOWER POT STAND.
No. 312,159. Patented Feb. 10, 1885.
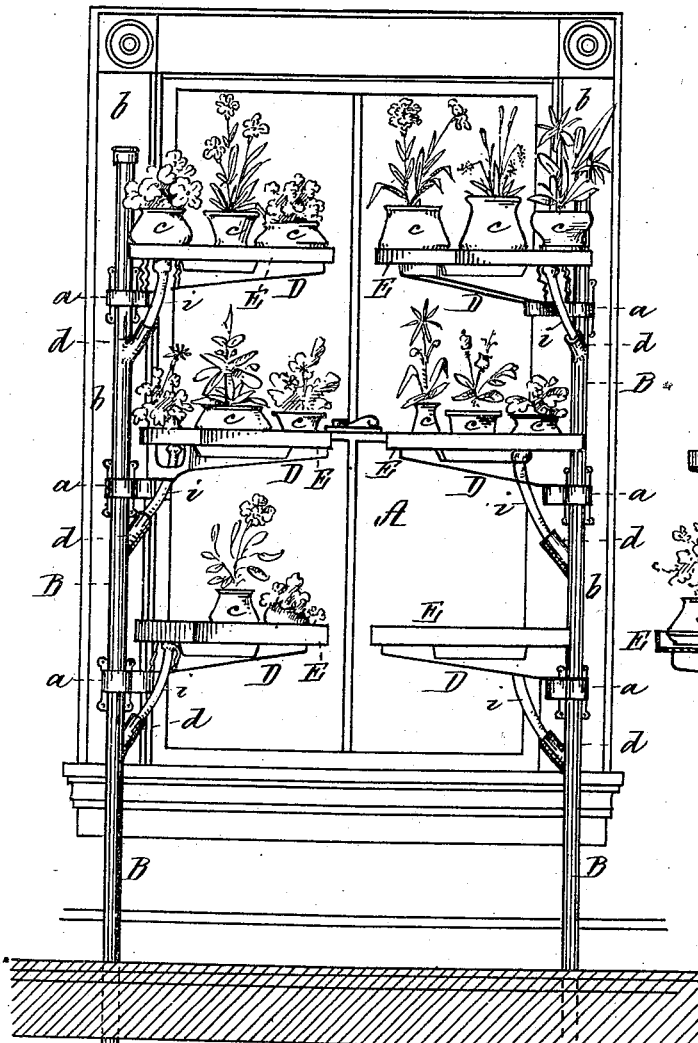
Witnesses: Inventor.
H. W. Stearns  Alfred H. Perkins,
Jas. W. Chapman  pr Norman W. Stearns,
 Atty.

(No Model.)  2 Sheets—Sheet 2.

A. H. PERKINS.
FLOWER POT STAND.

No. 312,159. Patented Feb. 10, 1885.

Witnesses:
H. W. Stearns.
Jas. W. Chapman

Inventor.
Alfred H. Perkins,
per Norman W. Stearns,
Atty.

UNITED STATES PATENT OFFICE.

ALFRED H. PERKINS, OF LEOMINSTER, MASSACHUSETTS.

FLOWER-POT STAND.

SPECIFICATION forming part of Letters Patent No. 312,159, dated February 10, 1885.

Application filed April 25, 1884. (No model.)

*To all whom it may concern:*

Be it known that I, ALFRED H. PERKINS, of Leominster, in the county of Worcester and State of Massachusetts, have invented certain Improvements in Flower-Pot Stands, of which the following is a full, clear, and exact description, reference being had to the accompanying drawings, making part of this specification, in which—

Figure 3:
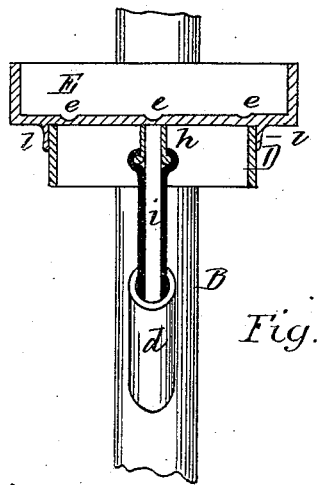
Figure 4:
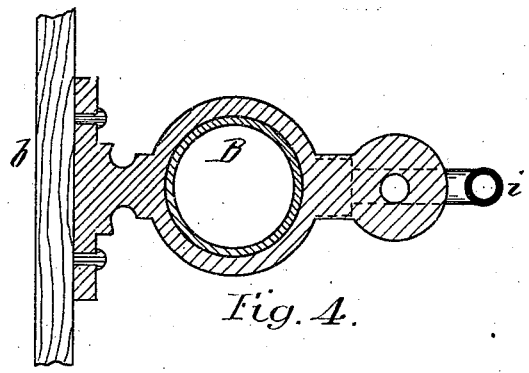
Figure 5:
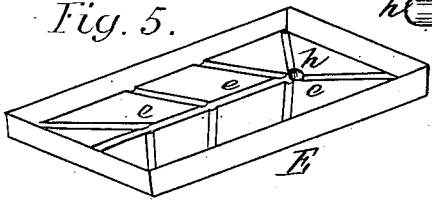
Figure 6:
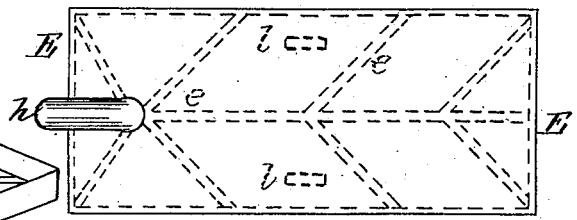

Figure 1 represents a window having a number of plants located thereat, the flower-pots resting in trays placed on brackets which are free to swing on the supports of the vertical pipes, the parts being constructed in accordance with my invention. Fig. 2 is a vertical longitudinal section. Fig. 3 is a transverse vertical section; Fig. 4, a horizontal section, enlarged, on $y\ y$ of Fig. 2. Figs. 5 and 6 represent the flower-pot receptacles.

This invention has particular reference to flower-pot stands located in dwelling-houses, &c., and usually occupying a position at the windows of the same. In such situations, where flower-pots of the ordinary construction are employed, when the flowers or plants therein are watered, the water is free to percolate through the dirt and out of the holes in the bottoms of the pots upon the carpet or floor thereunder, thus causing inconvenience in removing the same, and frequently resulting in injury to the carpet.

To avoid the above-mentioned difficulty is the purpose of my invention, which consists in locating the flower-pots within a pan or other receptacle provided with an orifice in its bottom and having a flexible tube, (capable of being disconnected,) and leading therefrom into an upright pipe passing down to a sink or drain, through which the waste water escapes, the bearings of said pipe also serving, if desired, as supports for a series of swinging brackets, upon which the flower-pot receptacles are placed, whereby the position of the plants relative to the window and to the sunlight and heat or frost therefrom may be conveniently changed at pleasure.

My invention also consists in certain details of construction, to be hereinafter referred to and specifically claimed.

To enable others skilled in the art to understand and apply my invention, I will proceed to describe the manner in which I accomplish the same.

In the said drawings, A represents a window of a room in which flowers or plants are to be located.

B is a vertical pipe supported within suitable bearings or sockets, $a$, secured to the front of the casing $b$, the pipe being formed of a continuous length of gas-tubing, or, preferably, of sections of the same united by screw-couplings. One or both sides of the window may be provided with said pipes. The lower end of each pipe passes down through the floor into a sink or drain, C, below.

$d\ d$ are inclined branches leading a short distance up from said pipe, preferably on the side toward the window.

D D are a series of brackets, of well-known construction, which swing freely on the bearings supporting said pipe. The top of each bracket is flat to receive and support a large tray or receptacle, E, in which several flower-pots, $c$, are located, the receptacles being held in place on the brackets by projections $l$ on the under side of the former fitting over the sides of or into holes in the latter. Each tray or receptacle is provided with one or more channels, $e$, in the upper side of its bottom, leading into an outlet-pipe, $h$, located preferably near the edge of the receptacle toward the upright pipe B. The bottom of the outlet-pipe $h$ has a slight enlargement at its lower end, over which is sprung the upper end of a flexible (rubber) tube, $i$, the lower end of which is conducted into the open top of a short branch, $d$, of the vertical pipe B. The pots containing the plants or flowers are placed within the trays or receptacles E.

From the foregoing construction and arrangement, when water is turned into the pots to moisten and soften the dirt therein, it percolates through the same and runs out of the holes at their bottoms into the trays or receptacles thereunder, and thence is conducted by the channels $e$ to the outlet-pipes $h$, and down into the branches $d$ of and into the vertical drainage-pipes B, to the sink below, whereby the floor or carpet of the apartment is prevented from being wet and injured therefrom.

The means employed for supporting the brackets and allowing them to be swung, and the manner of holding the pipe B in a vertical position, may be changed without departing from the spirit of my invention, the essential features of which are the vertical drainage-pipe B, the trays or receptacles E for holding the flower-pots, and the outlet-tubes *i*, leading from the discharge-orifices *h* in said receptacles to the vertical pipe. The outlet-tubes may be rigid; but I prefer to use flexible tubes, as they yield and conform more readily to the different positions assumed by the brackets when swung to and from the window.

If desired, the flower-pot trays or receptacles may be used on an ordinary stationary frame or stand; but the swinging brackets are preferred, as they admit of the plants being conveniently exposed to or withdrawn from the heat and light of the sun, and removed from the influence of the frost which may collect on the window.

I claim—

1. The vertical pipe B, leading into the sink or drain C, one or more receptacles, E, and means for supporting the same, in combination with a flexible tube, *i*, leading from each receptacle into said pipe, for the escape of the waste water, as described.

2. The combination of the vertical pipe B, one or more adjustable brackets, D, means for supporting the same, a flower-pot receptacle, E, for each bracket, and a flexible tube, *i*, leading from each receptacle into the pipe B, as and for the purpose set forth.

3. A flower-pot receptacle, E, having its bottom provided with an outlet-orifice, *h*, and one or more channels, *e*, leading thereto, in combination with a bracket, D, means for supporting the latter, a flexible tube, *i*, and a waste-pipe, B, as specified.

Witness my hand this 22d day of April, 1884.

ALFRED H. PERKINS.

In presence of—
N. W. STEARNS,
JAS. W. CHAPMAN.